United States Patent [19]

Paap et al.

[11] 4,137,452
[45] Jan. 30, 1979

[54] METHOD OF MEASURING HORIZONTAL FLUID FLOW IN CASED OFF SUBSURFACE FORMATIONS WITH MANGANESE COMPENSATION

[75] Inventors: Hans J. Paap; Dan M. Arnold; Hubert D. Scott, all of Houston, Tex.

[73] Assignee: Texaco, Inc., New York, N.Y.

[21] Appl. No.: 808,422

[22] Filed: Jun. 20, 1977

[51] Int. Cl.² ............................................. G01V 5/00
[52] U.S. Cl. ................................................. 250/270
[58] Field of Search ............... 250/264, 265, 266, 269, 250/270

[56] References Cited
U.S. PATENT DOCUMENTS

| 3,304,424 | 2/1967 | Mills, Jr. | 250/270 |
| 3,603,795 | 9/1971 | Allaud | 250/264 |
| 3,864,569 | 2/1975 | Tittman | 250/264 |

Primary Examiner—Davis L. Willis
Attorney, Agent, or Firm—Carl G. Ries; Thomas H. Whaley; William J. Beard

[57] ABSTRACT

Fluid in permeable earth formations adjacent well casing is irradiated with neutrons to form radioactive tracer isotopes in the chemical elements comprising the fluid, typically sodium 24 in saline subsurface formation water, which decays by emission of gamma rays. By measuring the rate of decay of the radioactive isotope, a measure of horizontal fluid flow in the formation is obtained. Manganese, present in the steel well casing, has been found to also respond to the neutron irradiation by forming the isotope manganese 56 which emits gamma rays which interfere with the gamma radiation measurements of the trace element indicative of water flow. A method of measuring horizontal fluid flow while compensating for the presence of manganese 56 gamma rays is disclosed.

10 Claims, 5 Drawing Figures

GRAPHICAL ILLUSTRATION OF ITERATION TECHNIQUE

METHOD OF MEASURING HORIZONTAL FLUID FLOW IN CASED OFF SUBSURFACE FORMATIONS WITH MANGANESE COMPENSATION

CROSS-REFERENCE TO RELATED APPLICATIONS

The present application is directed to radioactive logging of wells to measure horizontal fluid flow in formations, as is co-pending U.S. Patent Application Ser. No. 698,394, filed June 21, 1976 now U.S. Pat. No. 4,051,368, assigned to the assignee of the present application.

BACKGROUND OF INVENTION

1. Field of Invention

The present invention relates to radioactive well logging techniques to measure the lateral flow of fluid in subsurface earth formations.

2. Description of Prior Art

In secondary and tertiary recovery of petroleum deposits many of the recovery techniques employ the injection of water or chemical solutions into the earth formations comprising the reservoir. In planning the recovery operation, the injection of water or chemical has in the past been limited by certain assumptions and/or approximations concerning the mobility of fluids in the formation comprising the reservoir. A crucial factor in such fluid injection programs is the vertical conformity of the producing formation as well as its horizontal permeability and uniformity. In some reservoirs, formation lensing or horizontal partitioning by permeability barriers such as faults can occur. In such instances, apparently correlevant intervals of permeability may be separated from one well to another in the field by such formation lensing or permeability barriers being interposed across the interval of formation between the wells.

It is therefore apparent that large amounts of costly chemicals or water could be injected before it is established that continuity between injection and producing wells is partially or totally absent. If, on the other hand, continuity does exist, it is known that the water in the vicinity of the producing well begins to flow laterally soon after injection is initiated and long before the injected fluid actually arrives at the producing well. The detection of lateral water flow is, therefore, indicative of formation continuity. The speed of the flow, when combined with injection rates, formation thickness, formation porosity, and well spacings, can be used to determine the degree of continuity. This early definition of formation continuity could prevent the expenditure of large sums of money, time and effort in a fruitless project to recover secondary or tertiary problem deposits.

A second application of the detection of lateral water-flow is the mapping of the total flow throughout a petroleum reservoir to help in the operational planning of injecting chemicals or water and to assist in determining optimum withdrawal rates. Moreover, a knowledge of the lateral water flow characteristics of a particular formation in a producing field can help greatly in general understanding of the reservoir dynamics of the particular reservoir being produced.

It is sometime desirable in a reservoir with multiple producing intervals for a reservoir engineer to be able to delineate those producing zones which provide the most water influx or water drive to the production of petroleum. The mapping of lateral water movement in all zones both above and below the expected water table in the producing formation should supply this information to the reservoir engineer.

In the past, reservoir engineers have been provided with relatively few and often inaccurate well logging instrumentation in order to determine the vertical conformance characteristics of the earth formations comprising a reservoir. This has led to resultant confusion as to the properties of the earth formations comprising a reservoir. Radioactive tracer studies of the movement of fluids in the vicinity of a well borehole can be misleading in this respect because of the lack of uniform absorption of the tracer element into the flowing stream of formation water. Also, it is difficult to provide tracer isotopes with sufficient half life to be injected at an injection well and observe their movement days or even weeks later at a monitoring or producing well, in order to obtain some idea of the lateral flow speed or velocity of fluids in the formation comprising the reservoir.

In co-pending application Ser. No. 698,934 referenced above, liquids in the formation adjacent the well were bombarded with high energy neutrons. Where the fluid was at least partially saline, as in salt water, radioactive $Na^{24}$ was produced by the thermal neutron capture $Na^{23}$ (n, $\gamma$) $Na^{24}$ reaction. By observing the decrease in gamma radiation from the $Na^{24}$ at 2.75 MeV or greater energy levels with time, a measure of the horizontal speed of the liquid was obtained.

However, although steps were taken to remove neutron bombardment induced gamma radiation from other elements and normal background gamma radiation from earth formations, problems still existed. For example, manganese present as $Mn^{55}$ in the steel well bore casing forms the radioactive isotope $Mn^{56}$ upon neutron bombardment. $Mn^{56}$ emits gamma radiation at several energy levels ranging from 0.85 MeV to 3.0 MeV and having a half-life of 2.56 hours. This gamma radiation has been found, according to the present invention, to contribute to observed counting rates of the $Na^{24}$ gamma radiation. Although the $Mn^{56}$ gamma radiation decays more rapidly than $Na^{24}$ to a negligible level due to its shorter half-life, elimination of this component by time delay has presented problems, particularly where linear flow speed was relatively high or salinity relatively low, or both. Time delay in these circumstances resulted in loss of significant counting statistics in the $Na^{24}$ gamma radiation as well as that of $Mn^{56}$.

SUMMARY OF INVENTION

Briefly, with the present invention, a method is disclosed for determining the flow rate of earth formation fluid moving in a horizontal direction past a steel casing having manganese as an element thereof in a well borehole. The earth formations in the vicinity of the well borehole at a particular depth are irradiated by bombardment with neutrons for a predetermined length of time to neutron activate elements in the casing and at least one selected tracer element in the earth formation fluid moving past the well borehole. Count rate signals representative of gamma radiation are then detected during at least three and possibly more time intervals in order to obtain a representative measure of gamma radiation caused by the radioactive decay of elements in the casing and the selected tracer element in the formation fluid. The time duration of at least three time intervals during which gamma radiation is detected is also measured. Based on the detected count rate signals and the measured time intervals, the flow velocity of the fluid is obtained, as well as the measure of the amount of gamma radiation attributable to the element in the casing, typically manganese isotope 56, and a measure of the amount of gamma radiation attributable to the tracer element in the fluid, typically sodium isotope 24. Where desired, the number of additional count rate measurements may be increased, together with the number of measured time intervals to obtain a more statistically precise measure. As another feature of the present invention, the obtaining of a measure of the amount of gamma radiation attributable to elements in the casing and to the tracer element in the fluid lends itself to an iterative process wherein an initial or test flow speed is assigned and initial measures of the amount of gamma radiation attributable to elements in the casing and to the tracer element in the fluid are obtained. The test flow speed is then adjusted based on the results of the initial measures obtained, and subsequent measures of the presence of the elements in the casing and tracer elements in the fluid repeated until a statistically acceptable fluid flow velocity is obtained.

Accordingly, with the present invention, the lateral movement of fluids in a well borehole is accurately obtained and determined by neutron activation of the element sodium present in salt water as a portion of the fluids present in the formations adjacent the borehole. Furthermore, the effects of manganese present in the alloy steel of the casing is taken into account and compensation for the otherwise interfering effect of neutron induced gamma radiation of the manganese effected. Thus, according to the present invention, a more accurate and precise measure of lateral movement and horizontal flow speed of formation fluid in the vicinity of a well borehole is obtained.

Other objects, features and advantages of the present inventon will become apparent to those skilled in the art when considering the following detailed description of the invention.

DESCRIPTION OF PREFERRED EMBODIMENT

I. PHYSICAL PRINCIPLES INVOLVED

Figure 2:
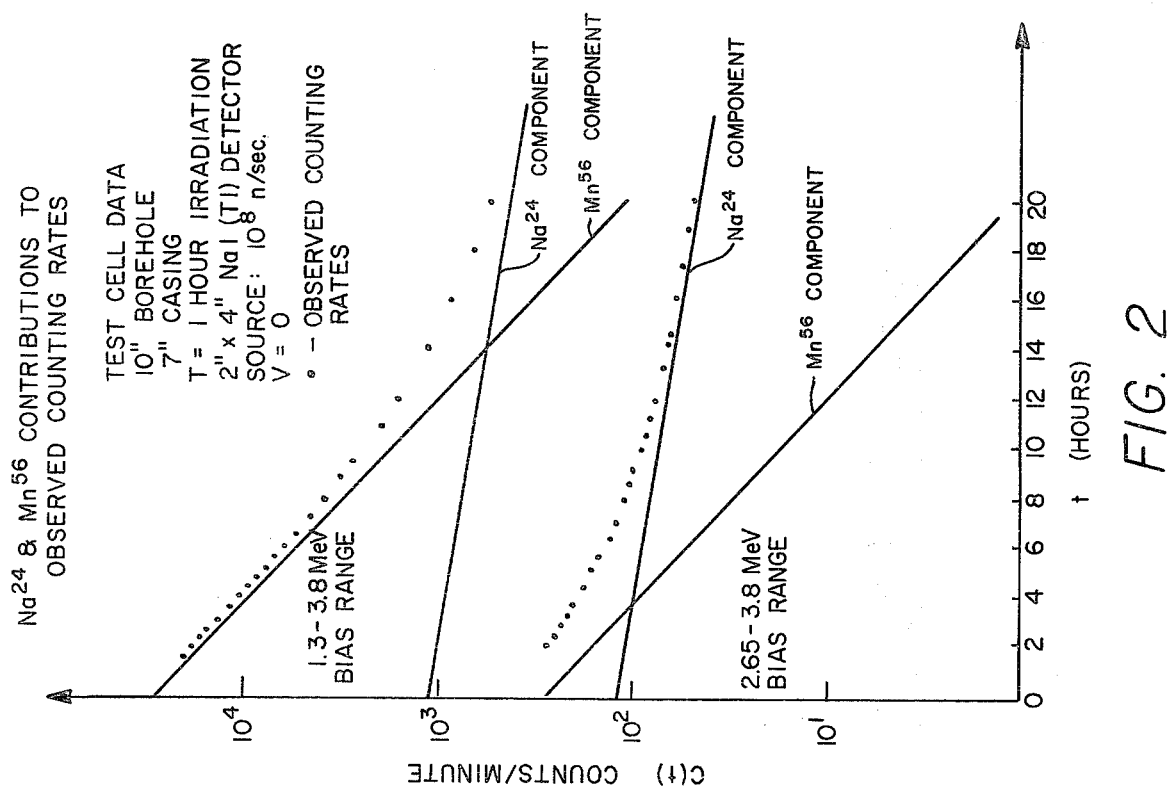
FIG. 2 is a graphical representation illustrating measured counting rates as a function of time and of gamma radiation detector bias levels of neutron induced gamma radiation from sodium isotope 24 and manganese isotope 56.

U.S. Patent Application Ser. No. 698,934, referred to hereinabove discloses a technique of measuring v, the linear speed of water moving past a cased well bore at an angle of approximately 90° with respect to the axis of the well bore. The knowledge of v so obtained is very useful in current secondary recovery, future tertiary recovery, and other field operations.

According to this technique, it is possible to "manufacture" radioactive isotopes within certain liquids by irradiating the moving liquid with neutrons. As an example, if the formation water is saline, radioactive $Na^{24}$ can be produced by the thermal neutron capture $Na^{23}$ $(n,\gamma)$ $Na^{24}$ reaction.

Accordingly, a logging sonde containing a neutron source is positioned within the well borehole adjacent a formation containing horizontally moving water. The neutron source irradiates the water producing radioactive $Na^{24}$ which decays by the emission of gamma radiation. When a gamma ray detector is moved to the position of the neutron source, a decrease in intensity with time of the induced activity is observed. If the liquid is not moving and radioactive $Na^{24}$ is the only source of gamma radiation other than background or natural gamma radiation, the observed decrease in activity with time t will follow the exponential decay $e^{-\lambda Na\, t}$ where $\lambda Na$ is the decay constant of $Na^{24}$. If, however, the liquid is moving in a horizontal direction, the observed decrease in activity will be due to the exponential decay $e^{-\lambda Na\, t}$ plus an additional decrease caused by the induced activity being swept away from the vicinity of the detector by the moving liquid. The observed decrease in induced activity above the expected exponential decay $e^{-\lambda Na\, t}$ is thus used to determine the horizontal linear speed of the moving liquid.

In order to substantially limit possible interfering gamma radiation sources only gamma radiation above 2.65 MeV was counted. This bias was selected to include the 2.75 MeV radiation emitted by $Na^{24}$ and to exclude most background gamma radiation normally found in earth formations. One particular problem area was that of manganese, $Mn^{55}$ present in steel well casing alloys. In particular, it was felt that the 2.65 MeV bias was sufficiently high to exclude contributions from the manganese isotope $Mn^{56}$ (which emits relatively intense gamma radiation at energy levels of 0.84 MeV, 1.81 MeV and 2.12 MeV, less intense gamma radiation at energy levels of 2.70 MeV and 3.00 MeV, and decays with half life of 2.56 hours.) resulting from neutron capture by $Mn^{55}$ within the steel well bore casing.

However, with the present invention, it has been found that due to the nuclear characteristics of the elements sodium and manganese, particularly their radioactive isotope energy levels, contributions from neutron induced gamma radiation so overlap than the isotope $Mn^{56}$ effectively interferes with accurate and precise measurement of gamma radiation from the isotope $Na^{24}$, reducing the accuracy of the measurement of fluid speed v.

Referring now to FIG. 2, data obtained (under test conditions indicated) illustrate the relative contribution of, and overlapping gamma radiation levels of, the isotopes $Na^{24}$ and $Mn^{56}$. As can be seen, increasing the lower bias level of the gamma ray detector to 2.65 MeV reduces the number of $Mn^{56}$ gamma radiation counts. However, as is also evident from FIG. 2, an appreciable number of $Mn^{56}$ gamma radiation counts are still present even with a bias level of 2.65 MeV as the lower limit.

So far as is known, there is no way to adjust energy bias levels of a gamma ray detector and effectively differentiate between $Na^{24}$ and $Mn^{56}$ gamma radiation. As is evident from FIG. 2, the observed counting rates from $Mn^{56}$ are observed even with the energy bias of a gamma ray detector set at 2.65 MeV. Relative contributions from $Mn^{56}$ also increase at lower energy biases. One proposed method of eliminating this $Mn^{56}$ "interference" would be to delay the counting to allow the shorter lived $Mn^{56}$ to decay to a negligible level. In situations where either the linear flow velocity of the fluid is relatively high or the salinity of the water is relatively low, or both, long delays in counting results in loss of the $Na^{24}$ gamma radiation as well as that of $Mn^{56}$ prevent meaningful data concerning fluid flow velocity from being obtained.

II. APPARATUS

Figure 1:
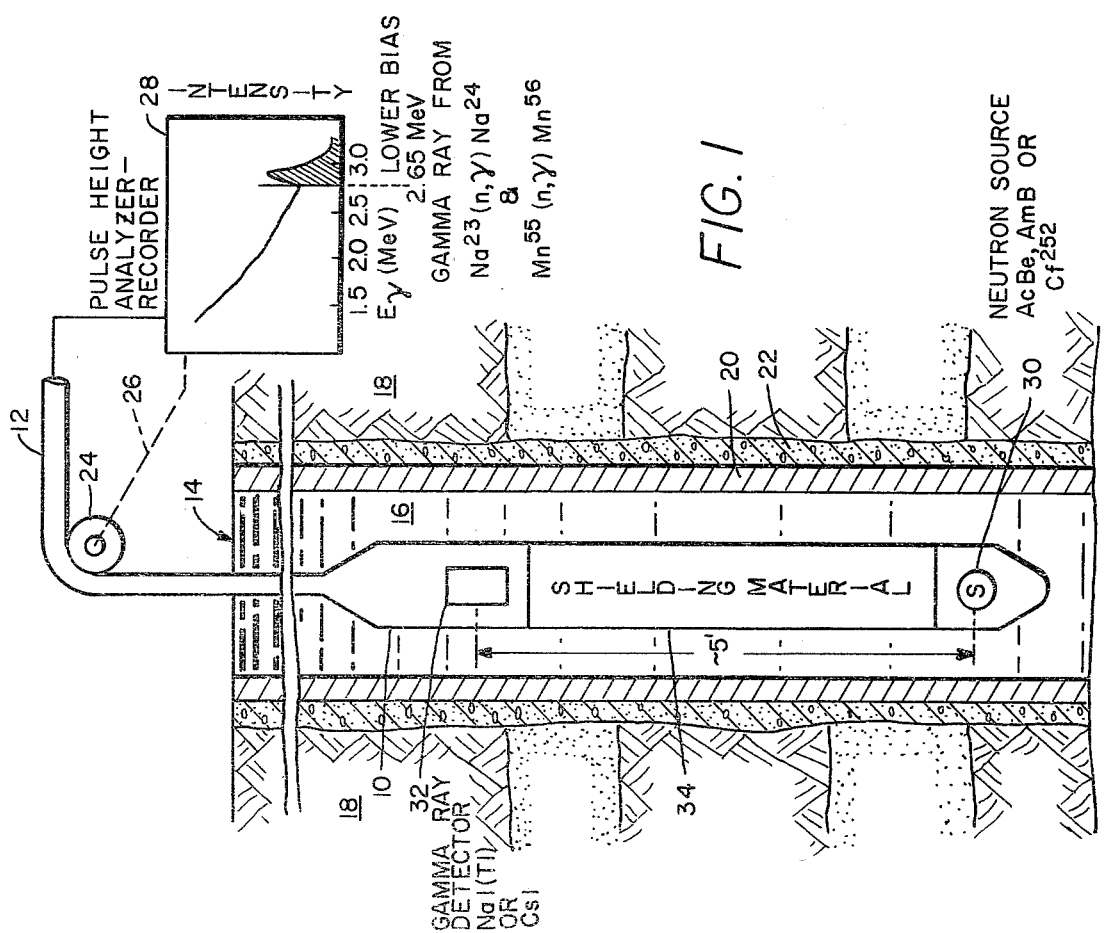
FIG. 1 is an illustration showing schematically a well logging sonde for horizontal water flow detection in accordance with the principles of the present invention.

Referring now to FIG. 1, a horizontal flow measuring system in accordance with the present invention is shown schematically. A downhole sonde 10 is shown suspended by a well logging cable 12 in a well borehole 14 which is filled with borehole fluid 16 and surrounded by earth formations 18. As is typical, a steel alloy casing 20 and cement lining 22 are interposed between the formation 18 and the sonde 10. The casing 20 is usually alloy steel, containing manganese as one of the component elements.

The well lodging cable 12 passes over a sheave wheel 24 which is mechanically or electrically coupled, as indicated by the dotted line 26, to a pulse-height analyzer/recorder 28 so that measurements from the downhole sonde 10 may be recorded as a function of depths in a well borehole 14. Housed in the downhole sonde 10 is, at its lower end, a neutron source 30 which may be a continuous chemical neutron source such as Actinium Berylium source, an Americium Beryllium source or a Californium 252 source as may be desired. For best results, the neutron source should have an intensity of at least $10^8$ neutrons per second.

Spaced about five feet from the neutron source is a single gammma ray scintillation detector 32. The detector 32 comprises a sodium iodide thalium activated crystal or a cesium iodide thallium activated crystal approximately 2 inches by 4 inches in extent and cylindrical in shape. The scintillation crystal of detector 32 is optically coupled through a photomultiplier tube (not shown) which functions to count scintillations or light flashes, occurring in the crystal from impingement thereon by high energy gamma rays from radioactive materials in the vicinity.

As is known in the art, the pulse height of voltage pulses produced by the photomultiplier of detector 32 are proportional to the energy of the gamma rays impinging upon the detector 32 crystal. Thus, a succession of pulses from the detector whose pulse height is proportional to the energy of the impinging gamma rays is produced and is coupled to the surface pulse height analyzer 28 via a conductor of the well logging cable 12. Appropriate power sources (not shown) are supplied at the surface and connected to the downhole electronic equipment via conductors of cable 12 in order to supply operational power for the downhole detector 32 in a manner conventional in the art.

The space between the neutron source 30 and the detector 32 in the downhole sonde 10 is shielded by a shielding material 34 of suitable type to prevent direct irradiation of the detector crystal with neutrons from the neutron source 30. Shielding materials with high hydrogen content such as paraffin or other polymolecular hydrocarbon structure may be utilized for this purpose. The high hydrogen content serves to slow down or rapidly attenuate the neutron population from the neutron source and prevent this thermalized neutron population from reaching the vicinity of the detector crystal. To this end, strong thermal neutron absorbers such as cadmium may be interposed in layers with the hydrogenate shielding material in order to make up the shield portion 34.

The sonde 10 is moved in the borehole 14 to a location with source 30 adjacent a formation under investigation, which is bombarded with high energy neutrons for a predetermined length of time T, preferably at least one hour. The sonde 10 is then moved so that the detector 32 is adjacent the neutron bombarded area to detect gamma radiation.

Signals from the downhole detector 32 are transmitted to the surface via the logging cable 12 and are provided as input to the pulse height analyzer/recorder 28. A lower energy window threshold which is set at approximately 2.65 MeV is utilized in the pulse height analyzer/recorder 28, for reasons set forth above.

III. DETERMINATION OF v WITH $Mn^{56}$ COMPENSATION

For the sonde 10, the counting rate $C(t_i)$ in counts per minute recorded in recorder 28 from gamma rays detected in detector 12, at time $t_i$ measured from the termination of an irradiation of T hours by the source, is given as follow:

$$C(t_i) = \frac{Mn \text{ Contribution}}{K_{Mn}e^{-\lambda_{Mn}t_i}} + \frac{Na \text{ Contribution}}{K_{Na}e^{-\lambda_{Na}t_i}f(vt_i,T)} + B \quad (1)$$

Where
$\lambda_{Mn}$ = decay constant of $Mn^{56}$ (1a);
$\lambda_{Na}$ = decay constant of $Na^{24}$ (1b);
$K_{Mn}$ = term proportional to the amount of Mn irradiated by the source (1c);
$K_{Na}$ = term proportional to the amount of Na irradiated by the source (1d);
B = background counting rate due to naturally occurring radioactive elements in the vicinity of the detector (1e).

It may be shown that the term $f(vt_i,T)$ defining the time decay of gamma radiation of $Na^{24}$ due to fluid flow is of the form:

$$f(vt_i,T) = 1 + a\,v[t_i + g(T)] + b(v[t_i + g(T)])^2 \quad (2)$$
$$+ c(v[t_i + g(T)])^3 + d(v[t_i + g(T)])^4$$

Where v is the horizontal speed of the water in inches per hour and a, b, c, and d are constants determined by borehole conditions and the porosity of the formation. These constant can be obtained from and verified by using test cell experimental data. As an example, for a 10 inch borehole with 7 inch casing in a 33% porosity sand formation, (3a) $a = 1.43 \cdot 10^{-2}$
(3b) $b = 5.78 \cdot 10^{-3}$
(3c) $c = 2.25 \cdot 10^{-4}$
(3d) $d = 4.00 \cdot 10^{-7}$ where (vt) is expressed in inches.

The term g(T) is also a polynomial of the form
(4) $g(T) = p + qT + rT^2$
(5a) where $p = 0$
(5b) $q = 0.4553$
(5c) $r = -0.01067$ were determined using a theoretical flow model.

The linear flow speed v of the formation fluid is the primary quantity of interest. It is therefore, necessary to solve equation (1) for v. Examining equation (1), it can be seen that (a) $\lambda_{Mn}$ and $\lambda_{Na}$ are known physical constants;

(b) a, b, c, d, p, q, and r are constants that can be obtained from test cells; and (c) $C(t_i)$, $t_i$, T, and B are quantities measured with the sonde 10.

The remaining unknown terms in equation (1) are, therefore, $K_{Mn}$, $K_{Na}$, and v, three unknowns. However, with the present invention, by obtaining counting rates $C(t_1)$, $C(t_2)$ and $C(t_3)$ at three distinct intervals at times $t_1$, $t_2$, $t_3$ after termination of irradiation interval T, three independent equations of the form of equation (1) exist which can be solved for v, $K_{Mn}$, and $K_{Na}$, in digital computers, analog computers or in other manners such as by graphical techniques. Determination of v using this direct approach is, however, extremely complex due to the fourth order polynomial f(vt,T). Thus, as another aspect of the present invention an alternative iterative method for determining v has been developed.

IV. ITERATIVE METHOD FOR DETERMINING V

First, assume that the sonde system set forth above measured the following three pairs of count rates and time intervals.

$[C(t_1), t_1]$
$[C(t_2), t_2]$
$[C(t_3), t_3]$ where $t_3 > t_2 > t_1$

Next, assume an initial or test value of $v = v_{(1)}$. With $[C(t_1), t_1]$ $[C(t_2), t_2]$, and $v_{(1)}$ equation (1) readily yields initial values for $K_{Mn}^{1,2}$ and $K_{Na}^{1,2}$ where the superscripts indicate that counting rates measured at times $t_1$ and $t_2$ were used to compute the values of $K_{Mn}$ and $K_{Na}$. Likewise, with $[C(t_1), t_1]$, $[C(t_3), t_3]$ and $v_{(1)}$ equation (1) yields $K_{Mn}^{1,3}$ and $K_{Na}^{1,3}$ It will be noted that $K_{Mn}^{1,2} = K_{Mn}^{1,3}$ and $K_{Na}^{1,2} = K_{Na}^{1,3}$ if and only if the assumed velocity $v_{(1)} = v$, the true velocity. If $v_{(1)}$ were chosen such that $v_{(1)} < v$, then $K_{Mn}^{1,3} > K_{Mn}^{1,2}$ and $K_{Na}^{1,3} < K_{Na}^{1,2}$. If $v_{(1)}$ were chosen such that $v_{(1)} > v$, then $K_{Mn}^{1,3} < K_{Mn}^{1,2}$ and $K_{Na}^{1,3} > K_{Na}^{1,2}$. By defining $R^{1,2} = K_{Mn}^{1,2}/K_{Na}^{1,2}$ and $R^{1,3} = K_{Mn}^{1,3}/K_{Na}^{1,3}$ it can be seen from the above inequalities that $R^{1,2} < R^{1,3}$ if $v_{(1)} < v$
$R^{1,2} > R^{1,3}$ if $v_{(1)} > v$ In addition, an inequality in R reflects more strongly an erroneous choice of $v_{(1)}$ than does either an equality in $K_{Mn}$ or $K_{Na}$.

Figure 3:
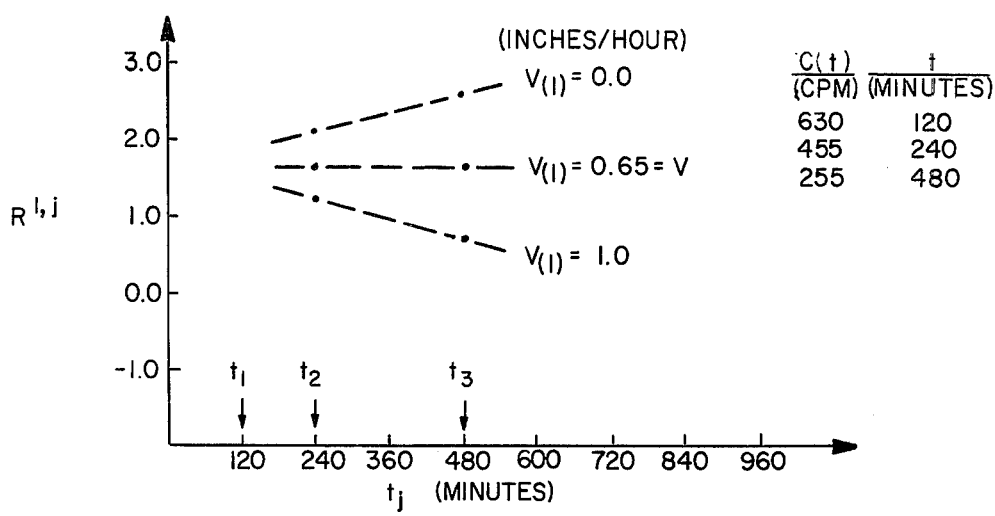
FIGS. 3, 4 and 5 are graphical representations illustrating the iterative method of simultaneously determining the formation fluid flow speed, relative presence of sodium isotope 24 and manganese isotope 56 according to the present invention.
Figure 4:
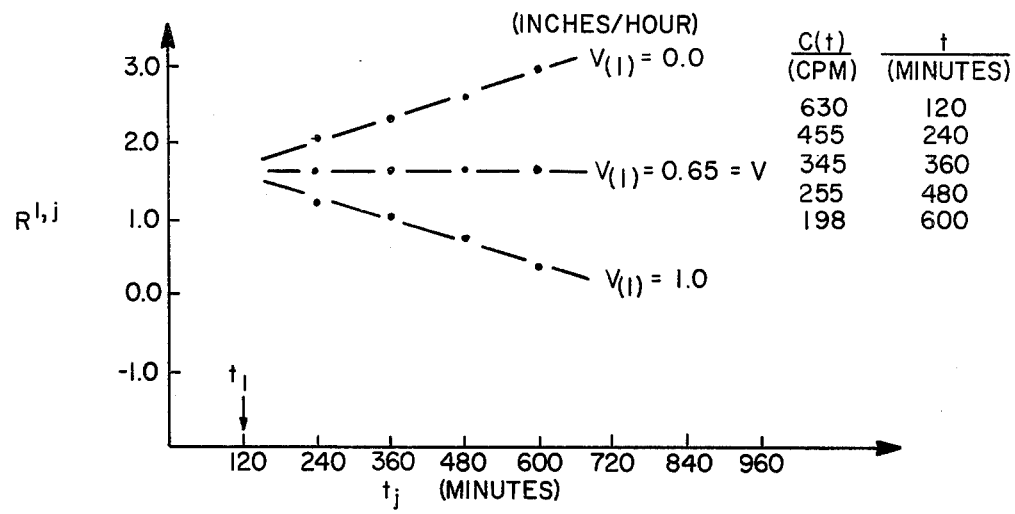

FIG. 3 shows $R^{1,j}$ computed from tabulated laboratory data, plotted as a function of $t_j$ for $v_{(1)} = 0$ inches/hour $v_{(1)} = 1.0$ inches/hour, and $v_{(1)} = 0.65$ inches/hour = the true v. It can be seen from the plot that $R^{1,2} = R^{1,3}$ only when $v_{(1)} = v = 0.65$ inches/hour. FIG. 3 also shows straight lines which are constructed through the data points. Note that the slope S of this line is an indicator of the equality of the $R^{i,j}$ values and thus the accuracy of choice of $v_{(1)}$. Referring again to FIG. 3, the slope S indicates that the choice of velocity $v_{(1)}$ is accurate when the slope S is zero, that is S = 0 if $v_{(1)} = v$ The nuclear decay process is statistical in nature. The measured quantities $C(t_i)$ have therefore, an associated statistical error which is reflected in the determination of v. This statistical error can be minimized with the present invention by measuring additional pairs $[C(t_i), t_i]$. FIG. 4 shows a plot of $R^{1,j}$ computed from the tabulated laboratory data, versus $t_j$ using five pairs of $[C(t_i), t_j]$. Again $R^{1,2} = R^{1,3} = R^{1,4} = R^{1,5}$ only when $v_{(1)} = v = 0.65$ inches/hour.

Figure 5:
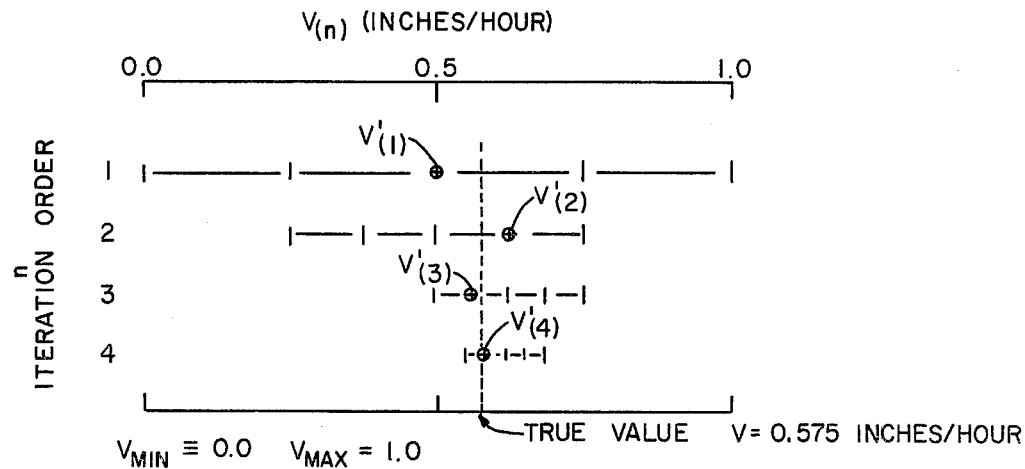

The iteration technique of the present invention for determining v is essentially a binomial search which can best be described graphically in FIG 5.

The quantities $v_{max}$ and $v_{min}$, the range of values over which $v_{(1)}$ is to be iterated are selected. Defining $D^{(1)} = (v_{max} - v_{min})/4$ the first order iterative values of velocity are $v_{(1)} = v_{min}$, $v_{min} + D^{(1)}$, $v_{min} + 2 D^{(1)}$, $v_{min} + 3 D^{(1)}$, $v_{max}$ For each $v_{(1)}$, the $R^{1,j}$'s are computed from all measured data pairs $[C(t_i), t_i]$, and then a line is least squares fitted through $R^{1,j}$ versus $t_j$. Subsequently, the slope of the line is determined, and finally the value of $v_{(1)}$ which gives the absolute minimum slope is denoted by $v'_{(1)}$.

The second order iteration begins by defining $D^{(2)} = D^{(1)}/2$. The second order iterative values of velocity are $v_{(2)} = v_{(1)}' - 2D^{(2)}$, $v_{(1)}' - D^{(2)}$, $v_{(1)}'$, $v_{(1)}' + D^{(2)}$, $v_{(1)}' + 2 D^{(2)}$ Again, for each $v_{(2)}$, the slope of the least squares fitted line through $R_{1,j}$ versus $t_j$ is computed and the velocity giving the absolute minimum slope, $V_{(2)}'$ is denoted.

The nth order iterative begins by defining $D^{(n)} = D^{(n-1)}/2$ with the nth order iterative velocity values being $v_{(n)} = v_{(n-1)}' - 2D^{(n)}$, $v_{(n-1)}' - D^{(n)}$, $v_{(n-1)}'$, $v_{(n-1)}' + D^{(n)}$, $v_{(n-1)}' + 2 D^n$ with $v_{(n)}'$ again being denoted as previously described.

Test results of the present invention have shown that $v_{(n)}$ converges rapidly on the true value v and that a three or four order iteration is usually within the statistical accuracy of the measurements.

The foregoing disclosure and description of the invention are ilustrative and explanatory thereof, and various changes in the size, shape, and materials as well as in the details of the illustrated construction can be made without departing from the spirit of the invention.

We claim:

1. A method for determining the location and flow rate of earth formation fluids moving in a horizontal direction past a steel casing in a well borehole comprising the steps of:

(a) irradiating the earth formations in the vicinity of a well borehole with fast neutrons for a predetermined length of time to neutron activate elements in the casing and at least one selected tracer element in the earth formation fluid moving past the well borehole;

(b) detecting during at least three separate time intervals count rate signals representative of gamma radiation caused by the radioactive decay of elements in the casing and the selected tracer element;

(c) measuring the at least three time intervals during which said step of detecting is being performed; and (d) obtaining, from the at least three detected count rate signals and the at least three measured time intervals the flow speed of the fluid, a measure of the amount of gamma radiation attributable to elements in the casing and a measure of the amount of gamma radiation attributable to the tracer element in the fluid.

2. The method of claim 1, wherein:

(a) said step of detecting comprises detecting during additional separate time intervals count rate signals caused by the radioactive decay;

(b) said step of measuring comprises measuring the separate additional time intervals; and (c) said step of obtaining includes obtaining from the additional count rate signals and time intervals a measure of the amount of gamma radiation attributable to elements in the casing and a measure of the amount of gamma radiation attributable to the tracer element in the fluid.

3. The method of claim 1, further including the step of:

compensating for background radiation naturally present in the casing, formation and fluid.

4. The method of claim 1, wherein said selected tracer element in the fluid comprises sodium isotope 24.

5. The method of claim 4, wherein said step of detecting comprises detecting only gamma radiation having an energy level greater than 2.65 MeV.

6. The method of claim 1, wherein the steel casing includes manganese as an element thereof and said step of detecting comprises detecting gamma radiation from manganese isotope 56.

7. The method of claim 1, wherein said step of obtaining a measure comprises:

(a) initially obtaining a measure of the amount of gamma radiation attributable to elements in the casing and to the tracer element in the fluid based on a test flow speed of the fluid;

(b) adjusting the test flow speed of the fluid based on the results of said step of initially obtaining a measure; and (c) subsequently obtaining a measure of the amount of gamma radiation attributable to elements in the casing and to the tracer element in the fluid based on the adjusted flow speed of the fluid.

8. The method of claim 7, further including the step of:

repeating said steps of adjusting the test flow speed and subsequently obtaining a measure until a statistically acceptable fluid flow speed is obtained.

9. The method of claim 1, wherein the predetermined length of time of said step of irradiating is at least one hour.

10. The method of claim 1, wherein said step of detecting gamma radiation caused by the radioactive decay of elements in the casing and said selected tracer element is performed by detecting said gamma radiation in an energy range containing overlapping decay gamma radiation energy levels of both said selected tracer element and said elements in the casing.

* * * * *